(12) United States Patent
Ginzel et al.

(10) Patent No.: US 6,553,238 B1
(45) Date of Patent: Apr. 22, 2003

(54) APPARATUS AND METHOD FOR THE REMOTE DIAGNOSIS, REMOTE MONITORING AND REMOTE INITIALIZATION OF AUTOMATIC DOORS, DOOR SYSTEMS AND GARAGE DOORS

(75) Inventors: Lothar Ginzel, Schwerte (DE); Willi Ressel, Witten (DE); Ulrich Theile, Hagen (DE)

(73) Assignee: Dorma GmbH + Co. KG, Ennepetal (DE)

( * ) Notice: Subject to any disclaimer, the term of this patent is extended or adjusted under 35 U.S.C. 154(b) by 0 days.

(21) Appl. No.: 09/214,837

(22) Filed: Jan. 5, 1999

Related U.S. Application Data

(63) Continuation-in-part of application No. PCT/EP97/06801, filed on Dec. 5, 1997.

(30) Foreign Application Priority Data

Dec. 6, 1996 (DE) .......................................... 196 50 569

(51) Int. Cl.⁷ .............................. H04B 1/38; H04M 1/00
(52) U.S. Cl. ...................................................... 455/557
(58) Field of Search ................................ 455/557, 556

(56) References Cited

FOREIGN PATENT DOCUMENTS

| DE | 3515945 | 11/1986 |
|----|---------|---------|
| DE | 3842467 | 6/1989 |
| DE | 4231803 | 3/1994 |
| DE | 4231816 | 3/1994 |
| EP | 0168520 | 1/1986 |
| GB | 2290007 | 12/1995 |

*Primary Examiner*—William Cumming
(74) *Attorney, Agent, or Firm*—Nils H. Ljungman & Associates

(57) ABSTRACT

Device and method for the remote diagnosis and/or remote monitoring and/or remote initialization of a microprocessor-controlled door, door system or garage door system operated by an electric motor. The microprocessor control can be connected with a data transmission device for the performance of a remote diagnosis and/or remote monitoring and/or remote initialization of the microprocessor control. The data transmission device can have a modem adapter. The modem adapter can connect the microprocessor control to a cellular telephone, which cellular telephone can be dialed through a cellular data network. The cellular telephone can also be part of the data transmission device. The data transmission device can simultaneously be effectively connected to a service center.

20 Claims, 7 Drawing Sheets

Steps for transmitting data between door service center computer and microprocessor

FIG. 7

Step for connecting microprocessor and door service center computer with wireless device 60 — Dial the door service center computer with the portable wireless telephone to place the door service center computer in communication with the portable wireless telephone

FIG. 8

Step for connecting microprocessor and door service center computer with wireless device 61 — Dial the portable wireless telephone with the door service center computer to place the portable wireless telephone in communication with the door service center computer

APPARATUS AND METHOD FOR THE REMOTE DIAGNOSIS, REMOTE MONITORING AND REMOTE INITIALIZATION OF AUTOMATIC DOORS, DOOR SYSTEMS AND GARAGE DOORS

CONTINUING APPLICATION DATA

This application is a continuation-in-part application of International Application No. PCT/EP97/06801, filed on Dec. 5, 1997, which claims priority from Federal Republic of Germany Patent Application No. 196 50 569.0, filed on Dec. 6, 1996. International Application No. PCT/EP97/06801 was pending as of the filing date of the above-cited application. The United States was an elected state in International Application No. PCT/EP97/06801.

BACKGROUND OF THE INVENTION

1. Field of the Invention

The present invention relates to an apparatus for the remote diagnosis and/or remote monitoring and/or remote initialization of a door, door system or garage door system controlled by a microprocessor, operated by an electric motor and monitored by sensors, as well as to a method for operating such an apparatus.

2. Background Information

German Patent Document 42 31 803 A1 describes a diagnosis and monitoring method for a door controlled by a microprocessor, driven by an electric motor and monitored by sensors, in which a regulation and control unit equipped with a microprocessor is connected to a data communications unit by means of a serial interface. Instruments, e.g. a portable computer (laptop) or a manual terminal equipped with an appropriate serial interface, can be connected to the data communications unit.

Although this method is used in some applications, it requires a major logistical effort on the part of the service department. This requirement results on one hand from the fact that a malfunction is reported to the service department only when the function of the door or door system has been more or less severely restricted. On the other hand, the service technician assigned to the defective door or door system has to take with him every conceivable replacement part he might need, because, as a rule, it is extremely difficult to guess what the cause of the problem might be on the basis of the information provided to the service department by the customer. Only after inspecting the system on site can the service technician use the serial interface to retrieve the data from the malfunctioning system in question.

German Patent No. 38 42 467 C2 describes a service system that is used to control a machine at a remote site. For this purpose, a modem is used which transmits the program modifications to a computer in a control center via a public telephone network.

A portable (cellular) telephone that can transmit data when connected to a laptop is described in GB 2 290 007 A.

German Patent No. 42 31 816 A1 teaches that the door in question can be equipped with a telephone line that is connected to a telecommunications network. The service department is thereby able to monitor the door or door system by retrieving data by dialing the telephone connection in question. In the event of a malfunction or failure, the dispatch of the service technicians can be managed more flexibly on the basis of an evaluation of the data transmitted.

In large buildings or structures, the system of internal extensions can use a dedicated line for the polling of data from the door or door system, so that the costs are negligible in relation to the number of doors or door systems or garage doors to be monitored.

In smaller and small buildings and structures, however, the costs for connecting and maintaining a telephone connection can be disproportionately high. But because the types of doors, door systems and garage doors installed in such small structures may have the same service requirements, because their function is identical, it may not be possible, for reasons of service economy, to eliminate the capability of remote diagnosis, remote monitoring and/or remote initialization.

It has been shown that the willingness of users to have the correspondingly more expensive on-site inspection of the door system performed has decreased significantly.

OBJECT OF THE INVENTION

The object of the present invention is therefore to make it possible to essentially guarantee qualified, economical service even on automatic doors, door systems and garage door systems in small buildings and structures that have only a small number of doors, or even only one door or garage door.

SUMMARY OF THE INVENTION

The present invention teaches that this object can be accomplished with a microprocessor control unit that can be connected indirectly or directly with a data transmission means, for the performance of a remote diagnosis and/or remote monitoring and/or initialization of the microprocessor control unit, whereby the data transmission means can be placed in effective communication with a service center.

In this manner, the conditions are created for service that does not depend on an expensive hard-wired telephone connection, thereby making it possible to maintain service on the highest level on the door and/or door systems or garage doors in question, even if the building or structure has only a single door or garage door that has to be monitored.

The object of the present invention is explained below using the example of doors, although it can naturally also be applied in an analogous manner to garage doors.

In one advantageous configuration of the present invention, the service center can be dialed directly or indirectly from the data transmission means, which increases the flexibility of operation.

In this case, it is also advantageous if a diagnostic program can be activated in the service center once the effective connection from the location of the door to the service center has been established.

The microprocessor control unit of the drive unit of the door or the doors is advantageously associated with a modem adapter that is effectively connected to the microprocessor control unit, which modem adapter is realized so that it can transmit data using a radiotelephone (cellular telephone) which can be dialed via a digital data network or via a connection that can be dialed automatically by the unit itself. Alternatively, other appropriate wireless communications units can also be used. The user can, depending on his personal preference, insert his cellular telephone into the modem adapter and dial the service number of the service center. A service computer connected to the service number will then start a diagnostic program that reads and analyzes all the parameters of the door to which it is connected. If, on the basis of the parameters transmitted, a deteriorating operating condition or decreased operational safety or reliability are detected, then, even before a defect occurs on the door in question, the door can be recorded in the service schedule of a service technician, so that the components or assemblies that require replacement can be taken from inventory, issued to the technician, and made available for the repair.

In accordance with an additional feature of the present invention, the modem adapter can have a loudspeaker to output voice traffic from the service center to the cellular telephone, whereby there can also be a microphone for the input of voice traffic via the cellular telephone to the service center. In the event of problems that cannot be unambiguously identified or solved by the diagnostic program, the service technician on the site can receive additional repair instructions to eliminate the problem from a hot-line specialist in the service center, in which case the hot-line specialist has access to the microprocessor system of the door by means of the cellular telephone connection. The service technician can then communicate verbally with the hot-line specialist by using the microphone located on the modem adapter.

It is also advantageous if the modem adapter has a keypad for the manual input of commands to the modem adapter and/or to the central station and/or to the microprocessor control unit, as a result of which the service technician can correspondingly influence the parameters of the modem, e.g. in the event of poor transmission quality, or the parameters of the microprocessor control unit.

It is advantageous if the modem adapter is associated with an image output device for the display of the data received or recorded in graphic form by the service center. Such a device makes possible a very high degree of integration of the diagnostic program, because digitized images or video sequences can be used for communication.

If the modem adapter is associated with an image recording or digital photography device for the recording of the images recorded on the door or the door system to the service central, this capability allows the hot-line specialist to form his own impression of the situation.

The apparatus in accordance with the present invention can be realized in a particularly simple manner if the microprocessor control unit has a PCMCIA slot for the insertion of a PCMCIA modem that can be connected to a cellular telephone, whereby the microprocessor control unit has a corresponding PCMCIA slot. In this manner, it becomes possible to use standardized components.

The present invention also teaches a method for the remote diagnosis and/or monitoring and/or initialization of a door or door system that is controlled by a microprocessor, operated by an electric motor and monitored by sensors. In an embodiment of a method in accordance with the present invention, when service is required, a cellular telephone is connected to the microprocessor control unit, whereupon a radiotelephone or cellular connection to a service center is established and the remote diagnosis and/or monitoring and/or initialization of the microprocessor is performed via the radiotelephone connection from the service center. This process can take place, for example, in the context of the regularly scheduled rounds of the building maintenance personnel, whereby the radiotelephone connection can be initiated from the cellular telephone. As soon as the radiotelephone connection has been established, the diagnostic program is run in the service center and analyzes the parameters of the microprocessor control unit, and if there are any changes in the operating conditions or a reduction in operational reliability or safety, the door in question is assigned an order number for a service order in the service schedule of a service technician.

But if the defect detected can be eliminated by a simple measure on site, e.g. by the input of specified commands via the keypad, the diagnostic program can immediately transmit the corresponding instructions in the form of speech via the loudspeaker, or, if there is a display device, by means of corresponding sequences of images to eliminate the problem.

This method achieves a high degree of flexibility, which significantly reduces maintenance costs, even in small buildings with few doors that have to be monitored.

As a result of the targeted use of the apparatus in accordance with the present invention, the work to be performed by the technical personnel can be reduced. Each service, technician also knows what type of maintenance situation is waiting for him when he arrives, because another characteristic of the method is that he has been informed in advance of the content of the respective service order and issued the parts that have to be replaced. And even if there are surprises, he can easily access assistance by the hot-line specialists in the service center.

The above discussed embodiments of the present invention will be described further hereinbelow with reference to the accompanying figures. When the word "invention" is used in this specification, the word "invention" includes "inventions," that is, the plural of "invention." By stating "invention," the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to one possible exemplary embodiment that is more or less schematically illustrated in the accompanying drawings, in which:

FIGS. 7 and 8 are charts showing optional steps involved in connecting the microprocessor and the door service center computer with the wireless device.

DESCRIPTION OF THE PREFERRED EMBODIMENT

Figure 1:
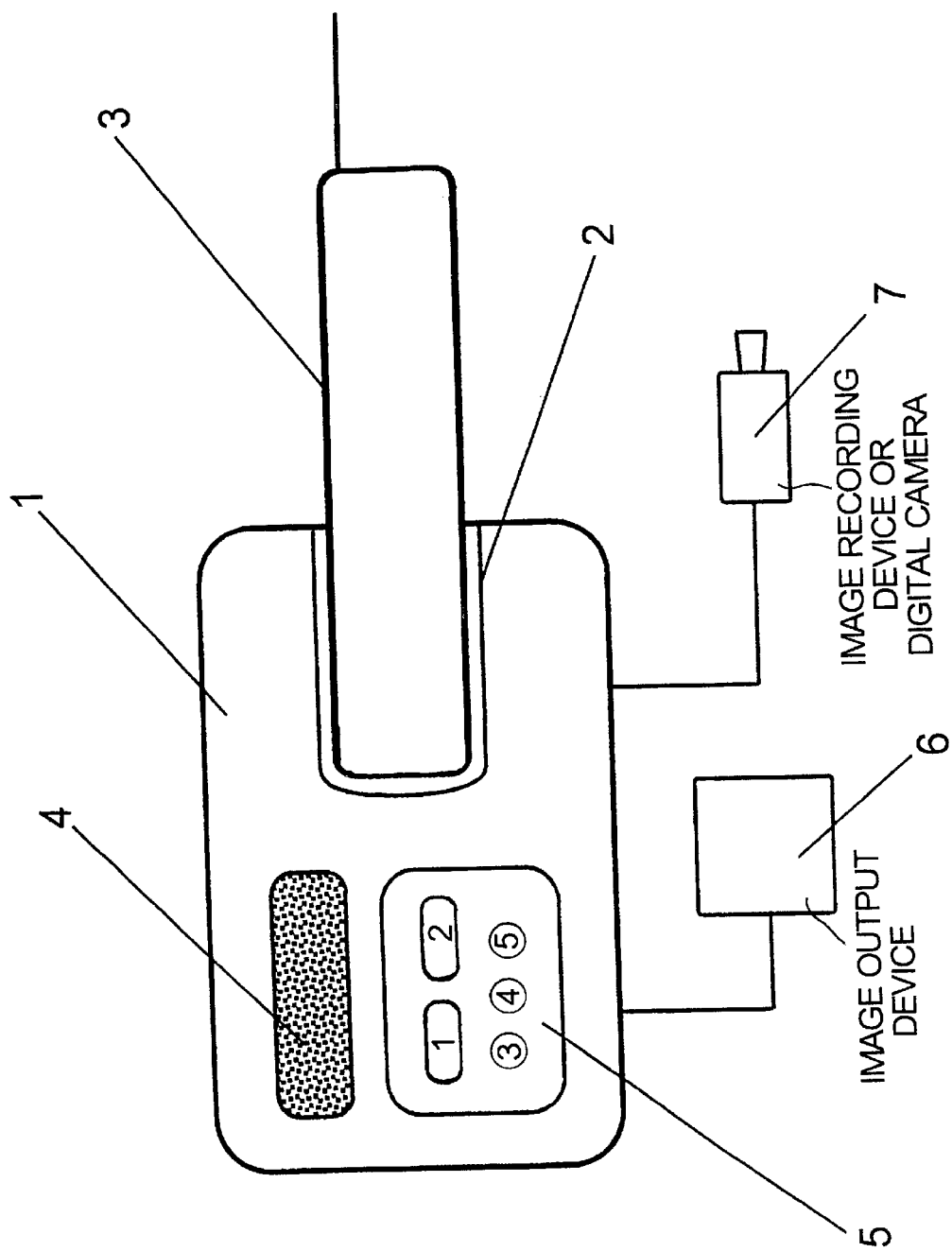
FIG. 1 shows a device in accordance with the present invention.

Please note that corresponding parts in the three drawings are identified by the same numbers. FIG. 1 shows a microprocessor control unit—which is not shown in any detail because it is not part of the invention—and a modem adapter 1 which is effectively connected to it.

The modem adapter 1 has a receptacle 2 for data transmission means, preferably a cellular telephone 3, which interact electrically with a connector plug in a corresponding socket of the modem adapter 1. In the context of the invention, it is also conceivable that an acoustic coupler or modem can be used. The modem adapter 1 is also equipped with a loudspeaker 4 and a keypad 5. The keypad 5 can be used by the service technician to operate certain functions of the door or door system for test purposes. The service technician can also press a button or key to actuate the loudspeaker, so that he can receive verbal instructions from the service center during his activity.

There can also be a microphone—also not shown—by means of which the service technician for his part can make voice contact with the service center, so that he can have access to skilled assistance if he encounters any unexpected problems.

Figure 2:
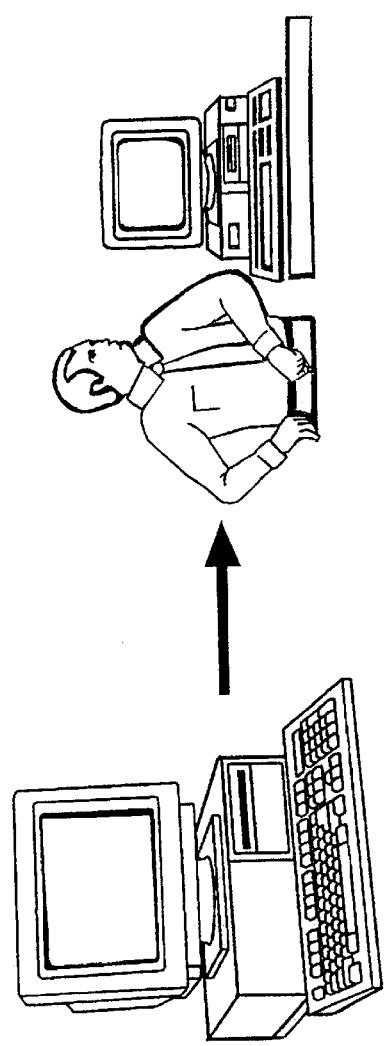
FIG. 2 shows a schematic diagram illustrating the operation of the device illustrated in FIG. 1.
Figure 2:
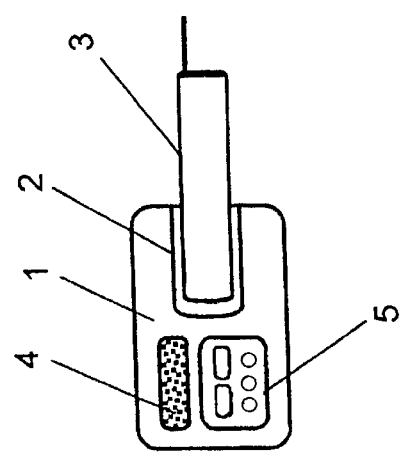

FIG. 2 shows the sequence of actions in a diagnosis with voice output. Using the cellular telephone 3 inserted into the modem adapter 1, the service center is dialed via a communications network, such as the telephone company or another communications carrier, where a modem transmits the incoming call to a personal computer (PC). Alternatively, the call can be connected to a server or a computer network mainframe. Installed on the PC is a diagnostic program which has a speech-supported troubleshooting capability. If the diagnostic program is not able to analyze the parameters, the hot-line specialist can be called by pressing a corresponding key on the keypad 5. The hot-line specialist can then give additional repair instructions via the voice link. With the aid of such a hot-line specialist, the service technician can immediately repair the door even if he encounters unexpected problems.

Approximately 90% of all diagnostic operations and initializations can be performed by the diagnostic program. A hot-line specialist therefore has to be consulted in only about 10% of all service calls.

As also illustrated in FIG. 1, the modem adapter 1 is associated with an image output apparatus 6. This image output apparatus can be used by the hot-line specialist in the service center, or can be used directly by the diagnostic program to transmit data in graphic form, in addition to verbal instructions.

Also associated with the modem adapter 1 is an image recording or digital camera apparatus 7 which is provided at an appropriate location in the vicinity of the door, and can be connected to the modem adapter 1, and can be used by the hot-line specialist to conduct a visual evaluation of the door or the door system, or by the service technician for visual communication with the hot-line specialist.

The modem adapter 1, however, can also be realized using PCMCIA technology. The microprocessor control unit is then associated with a corresponding PCMCIA slot, to which the PCMCIA modem can be connected, which can be connected to the cellular telephone 3. The image output apparatus 6 and the image recording device 7 can then, of course, be connected indirectly via the microprocessor control unit with the modem adapter 1.

Figure 3:
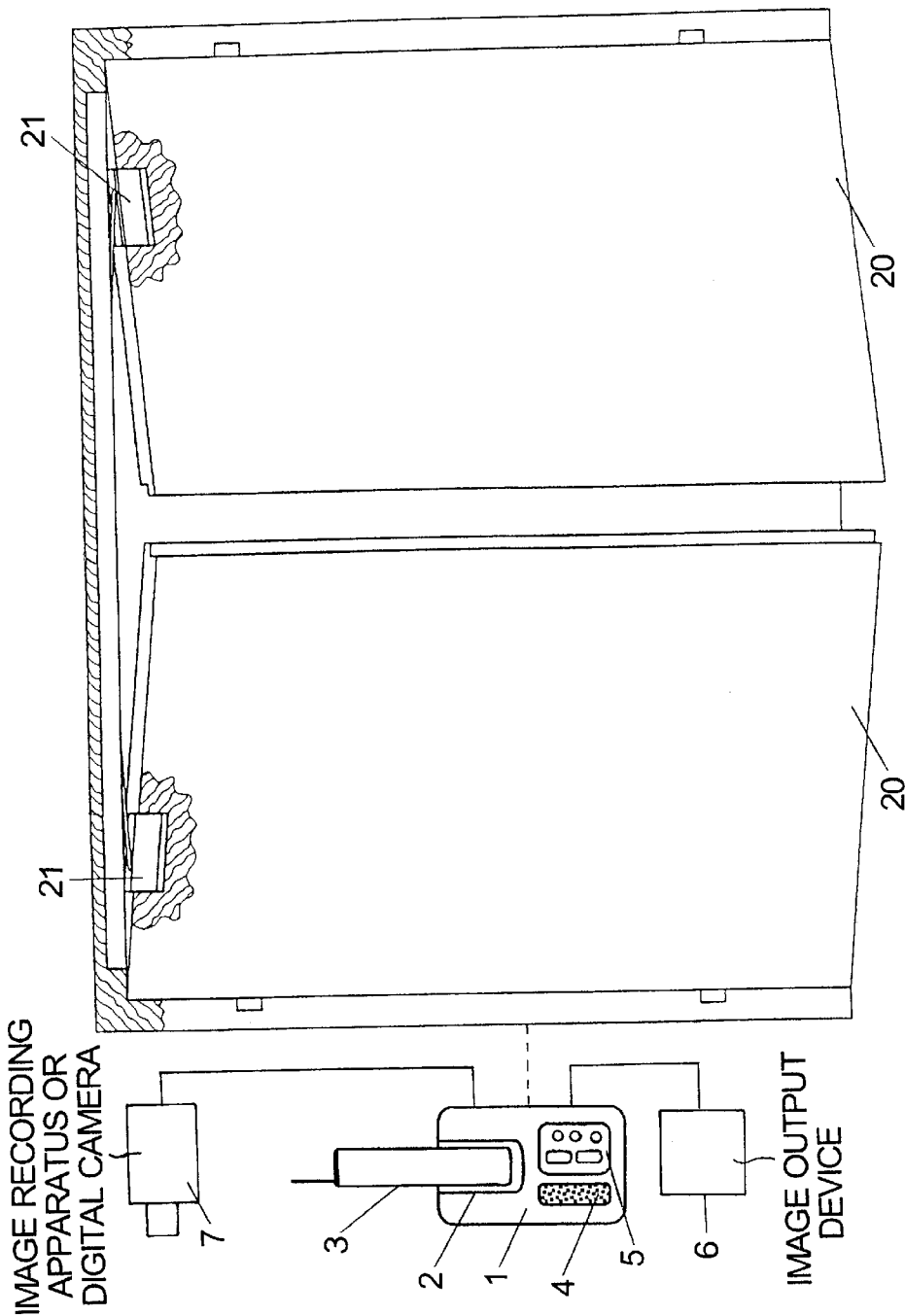
FIG. 3 shows a schematic diagram illustrating one possible embodiment of the present invention with the device of FIG. 1 operatively connected to a door system.
Figure 4:
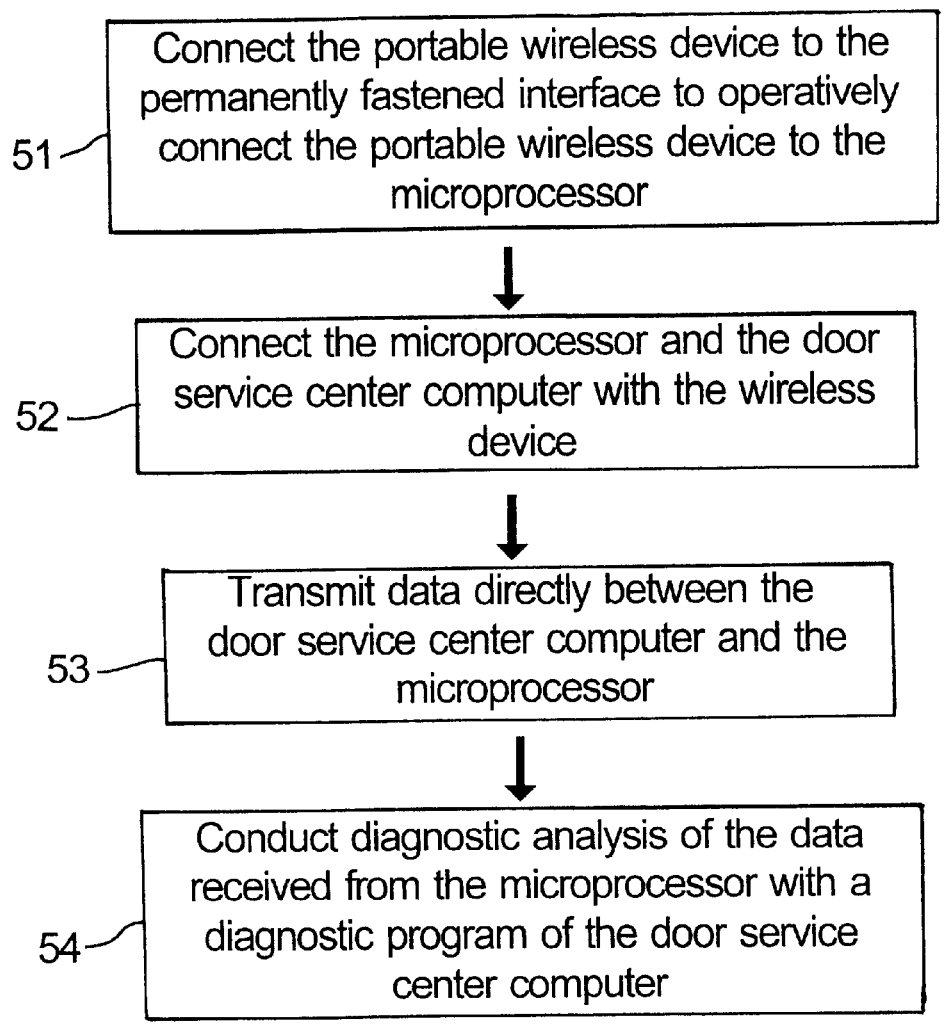
FIG. 4 is a flow chart of a method for the remote diagnosis and/or monitoring and/or initialization of a door or door system in accordance with at least one embodiment of the present invention.
Figure 5:
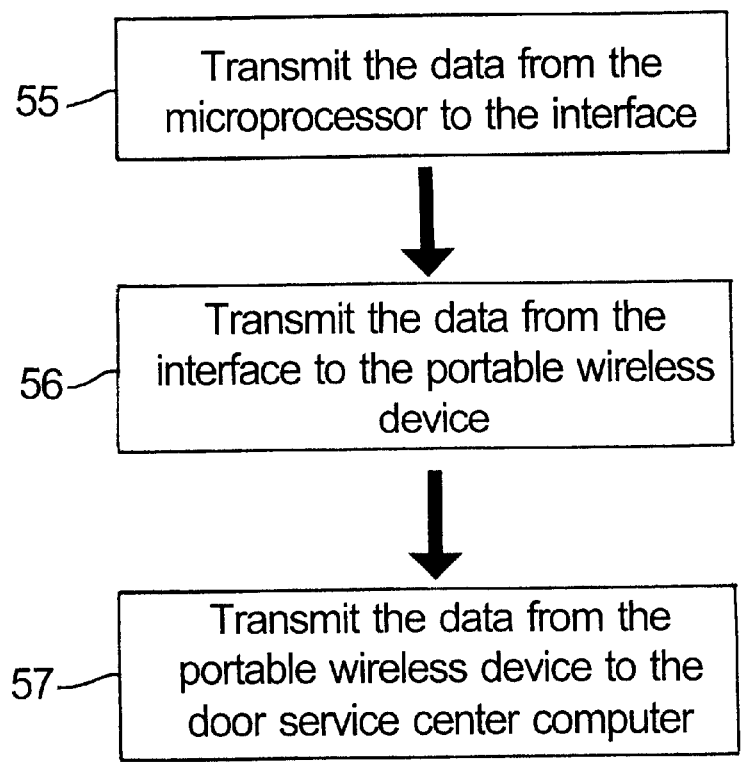
FIG. 5 is a flow chart showing the steps involved in transmitting data between the door service center computer and the microprocessor in accordance with at least one embodiment of the present invention.
Figure 6:
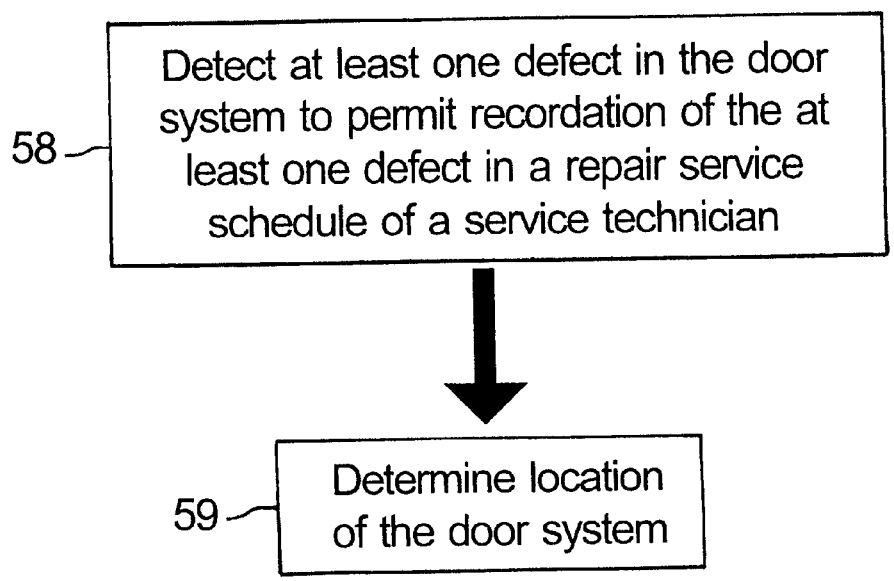
FIG. 6 is a flow chart showing the steps involved in conducting a diagnostic analysis of the data received from the microprocessor in accordance with at least one embodiment of the present invention.

FIG. 3 shows one possible embodiment of the present invention with a door system having door panels 20 and closing devices 21. The modem adapter 1 can be operatively connected to the door system to receive information from the door sensors and microprocessor—not shown—to permit remote diagnosis and/or monitoring and/or initialization of the door system.

The type of remote diagnosis and/or monitoring and/or initialization of a door or door system controlled by a microprocessor, operated by an electric motor and monitored by sensors is explained below by way of example. First the cellular telephone 3 is connected by means of the modem adapter 1 to the microprocessor control unit (not shown). This connection is used to establish a communications connection with the service center, whereby the communications connection with the service center is initiated from the cellular telephone. It is also possible, however, to initiate the call from the service center. The remote diagnosis and/or monitoring and/or initialization of the microprocessor control unit then takes place via the communications connection from the service center. As a rule, after the communications connection has been established, first the diagnostic program is executed and analyzes the parameters of the microprocessor control unit. Depending on the results of the analysis, the diagnostic program can perform a remote monitoring or a remote initialization, e.g. in the event of modifications in the version of the microprocessor program, which is generally stored in an EPROM, by overwriting the program.

If the diagnostic program determines that the operating condition has changed or that there has been a reduction in operational reliability or safety, the location of the door in question is recorded in the form of a service order in the service schedule of a service technician.

The service order will include a description or analysis of the problem, a repair schedule as well as corresponding replacement parts and tools. The replacement parts required for the completion of the respective service order will be issued and made available in advance, so that the service technician should have with him everything required for a successful repair or service call, including all the necessary information and supplies, such as any special tools that may be required, before leaving the service center.

One feature of the invention resides broadly in the apparatus for the remote diagnosis and/or remote monitoring and/or remote initialization of a door, door system or garage door system controlled by a microprocessor, operated by an electric motor and monitored by sensors, characterized by the fact that the microprocessor control unit can be connected directly or indirectly with a data transmission means, for the performance of a remote diagnosis and/or remote monitoring and/or remote initialization of the microprocessor control unit, whereby the microprocessor control unit is associated with a modem adapter 1 that can be effectively connected to it, which modem adapter 1 is realized with a data transmitting receptacle 2 for a cellular telephone 3 that can be dialed by means of a communications network and that embodies the data transmission means, whereby the data transmission means can be simultaneously placed in communication with a service center.

Another feature of the invention resides broadly in the apparatus characterized by the fact that the service center can be dialed directly or indirectly by the data transmission means.

Yet another feature of the invention resides broadly in the apparatus characterized by the fact that when the effective connection has been established, a diagnostic program can be activated in the service center from the location of the door.

Still another feature of the invention resides broadly in the apparatus characterized by the fact that the modem adapter 1 has a loudspeaker 4 to output the voice traffic transmitted from the service center to the cellular telephone 3.

A further feature of the invention resides broadly in the apparatus characterized by the fact that the modem adapter 1 has a microphone for the input of voice traffic via the cellular telephone to the service center.

Another feature of the invention resides broadly in the apparatus characterized by the fact that the modem adapter 1 has a keypad 5 for the manual input of commands to the modem adapter 1 and/or to the service center and/or to the microprocessor control unit.

Yet another feature of the invention resides broadly in the apparatus characterized by the fact that the modem adapter 1 is associated with an image output apparatus 6 for the display of the graphic data received from the service center or stored in the microprocessor control unit.

Still another feature of the invention resides broadly in the apparatus characterized by the fact that the modem adapter 1 is associated with an image recording device 7 to record the images of the door, door system or garage door system, and to transmit said images to the service center.

A further feature of the invention resides broadly in the apparatus characterized by the fact that the modem adapter 1 is a PCMCIA modem that can be connected to the cellular telephone, whereby the microprocessor control unit is associated with a corresponding PCMCIA slot 2.

Another feature of the invention resides broadly in the method for the remote diagnosis and/or remote monitoring and/or remote initialization of a door, door system or garage door system controlled by a microprocessor control system, operated by an electric motor and monitored by sensors, characterized by the fact that the data transmission means, in particular a cellular telephone 3, are connected to the microprocessor control unit, whereupon a communications connection with a service center is established, and the remote diagnosis and/or remote monitoring and/or remote initialization of the microprocessor control unit is performed from the service center, and after the communications connection has been established, a diagnostic program is executed which analyzes the parameters of the microprocessor control unit, whereby in the event of deteriorating operating conditions or a reduction in operational reliability or safety, the location of the door in question is recorded in the form of a service order in the service schedule of a service technician.

Yet another feature of the invention resides broadly in the method characterized by the fact that the establishment of the communications connection to the service center is initiated from the cellular telephone 3.

Still another feature of the invention resides broadly in the method characterized by the fact that the replacement parts for the respective service order are issued and made available to the service technician in advance.

Examples of microprocessors that are part of a door system which may possibly be utilized or adapted for use in the present invention may be found in the following U.S. patents.: U.S. Pat. No. 5,625,266, issued on Apr. 29, 1997 to inventor Stark; U.S. Pat. No. 5,682,023, issued on Oct. 28, 1997 to inventors McHugh, et al.; U.S. Pat. No. 5,479,151, issued on Dec. 26, 1995 to inventors Lavelle, et al.; U.S. Pat. No. 5,453,736, issued on Sep. 26, 1995 to inventor Noren; U.S. Pat. No. 5,142,152, issued on Aug. 25, 1992 to inventor Boiucaner; U.S. Pat. No. 5,140,173, issued on Aug. 18, 1992 to inventors Chau, et al.; U.S. Pat. No. 5,070,442, issued on Dec. 3, 1991 to inventors Syron-Townson, et al.; U.S. Pat. No. 4,994,724, issued on Feb. 19, 1991 to inventor Hsu; 4,831,509, issued on May 16, 1989 to inventors Jones, et al.; and U.S. Pat. No. 4,808,995, issued on Feb. 28, 1989 to inventors Clark, et al.

Examples of sensors or monitoring systems which may possibly be utilized or adapted for use in the present invention may be found in the following U.S. patents: U.S. Pat. No. 5,625,266, issued on Apr. 29, 1997 to inventor Stark; U.S. Pat. No. 5,633,626, issued on May 27, 1997 to inventor Cawthorne; U.S. Pat. No. 5,812,391, issued on Sep. 22, 1998 to inventor Mehalshick; U.S. Pat. No. 5,070,442, issued on Dec. 3, 1991 to inventors Syron-Townson, et al.

Examples of control units that are part of a door system which may possibly be utilized or adapted for use in the present invention may be found in the following U.S. patents: U.S. Pat. No. 5,751,224, issued on May 12, 1998 to inventor Fitzgibbon; U.S. Pat. No. 5,105,131, issued on Apr. 14, 1992 to inventor Schap; and U.S. Pat. No. 5,039,925, issued on Aug. 13, 1991 to inventor Schap.

Examples of audio-visual or electronic communication devices which may possibly be utilized or adapted for use in the present invention may be found in the following U.S. patents: U.S. Pat. No. 5,701,338, issued on Dec. 23, 1997 to inventors Leyen, et al.; U.S. Pat. No. 5,290,975, issued on Mar. 1, 1994 to inventors Mizuno, et al.; U.S. Pat. No. 5,760,848, issued on Jun. 2, 1998 to inventor Cho; and U.S. Pat. No. 5,365,438, issued on Nov. 15, 1994 to inventors Mitchell, et al.

Examples of PCMCIA modem devices which may possibly be utilized or adapted for use in the present invention may be found in the following U.S. patents: U.S. Pat. No. 5,809,068, issued on Sep. 15, 1998 to inventor Johnson; U.S. Pat. No. 5,783,999, issued on Jul. 21, 1998 to inventors Price, et al.; U.S. Pat. No. 5,608,607, issued on Mar. 4, 1997 to inventor Dittmer; U.S. Pat. No. 5,550,861, issued on Aug. 27, 1996 to inventors Chan, et al.; U.S. Pat. No. 5,537,654, issued on Jul. 16, 1996 to inventors Bedingfield, et al.; and U.S. Pat. No. 5,509,811, issued on Apr. 23, 1996 to inventor Homic.

Examples of digital cameras which may possibly be utilized or adapted for use in the present invention may be found in the following U.S. patents: U.S. Pat. No. 5,757,485, issued on May 26, 1998 to inventors Marcus, et al.; U.S. Pat. No. 5,541,656, issued on Jul. 30, 1996 to inventors Kare, et al.; U.S. Pat. No. 5,534,921, issued on Jul. 9, 1996 to inventor Sawanobori; U.S. Pat. No. 5,512,945, issued on Apr. 30, 1996 to inventors Sakurai, et al.; U.S. Pat. No. 5,249,053, issued on Sep. 28, 1993 to inventor Jain; and U.S. Pat. No. 5,049,983, issued on Sep. 17, 1991 to inventors Matsumoto, et al.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

NOMENCLATURE

1 Modem adapter
2 Receptacle
3 Cellular telephone
4 Speaker
5 Keypad
6 Image output apparatus
7 Image recording apparatus or digital camera
20 Door panel
21 Door closer

What is claimed is:

1. Monitoring system for the remote diagnosis and/or remote monitoring and/or remote initialization of a door system, being controlled by a microprocessor, operated by an electric motor, and monitored by sensors, said monitoring system comprising:

at least one data transmission device being configured to transmit and receive data;
said data transmission device being configured to be one of directly or indirectly connected to a microprocessor control unit of a door system;
said data transmission device being configured to transmit data directly between a remote location and said microprocessor; and
said data transmission device comprises:
a portable wireless device;
an interface;
said interface being configured and disposed to connect said wireless device with said microprocessor; and
said interface being permanently fastened to and connected with said door monitoring system.

2. A monitoring system for the remote diagnosis and/or remote monitoring and/or remote initialization of a door system, which door system has at least one door panel, a microprocessor control unit configured to control the door system, an electric motor configured to supply power to operate the door system, and sensors configured to monitor the door system, said monitoring system comprising:

at least one data transmission device being configured to transmit and receive data;
said data transmission device being configured to be one of: directly connected or indirectly connected to said microprocessor control unit;
said data transmission device being configured to transmit data directly between a remote location and said microprocessor control unit; and
said data transmission device comprising:
a portable wireless device;
an interface;
said interface being configured and disposed to connect said wireless device with said microprocessor control unit; and
said interface being permanently fastened to and connected with said door monitoring system.

3. The monitoring system according to claim 2, wherein:
said portable wireless device comprises a wireless telephone;
said interface comprises a modem adapter;
said modem adapter comprises a data transmitting receptacle which is configured to receive a wireless telephone; and
said modem adapter is configured and disposed to operatively connect said wireless telephone with said microprocessor control unit to permit transmission of data between said wireless telephone and said microprocessor control unit.

4. The monitoring system according to claim 3, wherein:
said wireless telephone is configured to contact a door service center computer to permit establishment of communication between said microprocessor control unit of said door system and said door service center computer.

5. The monitoring system according to claim 4, wherein:
said door service center computer is configured to be dialed by said wireless telephone to place said door service center computer in communication with said wireless telephone.

6. The monitoring system according to claim 5, wherein:
said wireless telephone is configured to be dialed by said door service center computer to place said wireless telephone in communication with said door service center computer.

7. The monitoring system according to claim 6, wherein:
said interface comprises a loudspeaker; and
said loudspeaker is configured to output voice communications received by said wireless telephone from a door service center.

8. The monitoring system according to claim 7, wherein:
said interface comprises a microphone;
said microphone is configured to receive voice communications from door service personnel located at said door system;
said microphone is configured to transmit said voice communications to said wireless telephone; and
said wireless telephone is configured to transmit said voice communications received from said microphone to a door service center.

9. The monitoring system according to claim 8, wherein:
said interface comprises a keypad;
said keypad is configured to permit the manual input of commands to at least one of:
said interface;
said microprocessor control unit; and
said door service center computer.

10. The monitoring system according to claim 9, wherein:
said monitoring system further comprises an image output apparatus; and
said image output apparatus is configured to display graphic data received from at least one of:
said microprocessor control unit of said door system; and
said door service center computer.

11. The monitoring system according to claim 10, wherein:
said monitoring system further comprises an imaging device;
said imaging device is configured to display images of the door system; and
said imaging device is configured to be connected to said interface to permit transmission of said images of the door system to a service center.

12. The monitoring system according to claim 11, wherein:

said door service center computer is configured to permit operation of a diagnostic program during communication with said microprocessor control unit of said door system to permit a diagnostic analysis of said door system.

13. The monitoring system according to claim 12, wherein said door system is one of: a door and a garage door.

14. The monitoring system according to claim 13, wherein:

said modem is a PCMCIA modem; and said microprocessor has a corresponding PCMCIA slot.

15. A method using a monitoring system for the remote diagnosis and/or remote monitoring and/or remote initialization of a door system, being controlled by a microprocessor, operated by an electric motor, and monitored by sensors, said monitoring system comprising: at least one data transmission device being configured to transmit and receive data; said data transmission device being configured to be one of directly or indirectly connected to a microprocessor of a door system; said data transmission device being configured to transmit data directly between a door service center computer at a remote location and said microprocessor; and said data transmission device comprising: a portable wireless device; an interface; said interface being configured and disposed to connect said wireless device with said microprocessor; and said interface being permanently fastened to and connected with said door monitoring system, said method comprising the steps of:

connecting said portable wireless device to said permanently fastened interface to operatively connect said portable wireless device to said microprocessor;

connecting said microprocessor and said door service center computer with said wireless device;

transmitting data directly between said door service center computer and said microprocessor; and said step of transmitting data further comprising the steps of:

transmitting said data from said microprocessor to said interface;

transmitting said data from said interface to said portable wireless device; and transmitting said data from said portable wireless device to said door service center computer.

16. The method according to claim 15, wherein said portable wireless device comprises a wireless telephone, and said method further comprises one of the following steps:

dialing said door service center computer with said portable wireless telephone to place said door service center computer in communication with said portable wireless telephone; and dialing said portable wireless telephone with said door service center computer to place said portable wireless telephone in communication with said door service center computer.

17. The method according to claim 16, further comprising the step of:

conducting a diagnostic analysis of said data received from said microprocessor with a diagnostic program of said door service center computer.

18. The method according to claim 17, wherein said step of conducting a diagnostic analysis further comprises:

detecting at least one defect in said door system to permit recordation of said at least one defect in a repair service schedule of a service technician.

19. The method according to claim 18, wherein said step of conducting a diagnostic analysis further comprises:

determining the location of said door system.

20. The method according to claim 19, wherein said at least one defect of said door system is at least one of: a deteriorating operating condition, decreased operational safety, and decreased operational reliability.

* * * * *

UNITED STATES PATENT AND TRADEMARK OFFICE
CERTIFICATE OF CORRECTION

PATENT NO. : 6,553,238 B1
DATED : April 22, 2003
INVENTOR(S) : Lothar Ginzel, Willi Ressel and Ulrich Theile It is certified that error appears in the above-identified patent and that said Letters Patent is hereby corrected as shown below:

<u>Column 4,</u>
Line 17, after "service" delete ",".

Signed and Sealed this

Twenty-third Day of September, 2003

JAMES E. ROGAN
*Director of the United States Patent and Trademark Office*